US009038529B2

United States Patent
Riessbeck et al.

(10) Patent No.: US 9,038,529 B2
(45) Date of Patent: May 26, 2015

(54) COFFEE MACHINE COMPRISING A FROTHING DEVICE AND MEANS FOR CLEANING THE FROTHING DEVICE AND A MILK SUCTION LINE AND PROCESS FOR RINSING THE MILK SUCTION LINE

(75) Inventors: Wolfgang Riessbeck, Landschlacht (CH); Pascal Peyrot, Mörschwil (CH)

(73) Assignee: EUGSTER/FRISMAG AG, Amriswil (CH)

( * ) Notice: Subject to any disclaimer, the term of this patent is extended or adjusted under 35 U.S.C. 154(b) by 449 days.

(21) Appl. No.: 13/021,519

(22) Filed: Feb. 4, 2011

(65) Prior Publication Data

US 2011/0192287 A1 Aug. 11, 2011

(30) Foreign Application Priority Data

Feb. 5, 2010 (DE) .......................... 10 2010 007 143

(51) Int. Cl.
| | |
|---|---|
| *B08B 9/027* | (2006.01) |
| *B08B 9/00* | (2006.01) |
| *A23L 1/00* | (2006.01) |
| *A47J 31/44* | (2006.01) |
| *A47J 31/60* | (2006.01) |

(52) U.S. Cl.
CPC .............. *A47J 31/60* (2013.01); *A47J 31/4485* (2013.01)

(58) Field of Classification Search
USPC ........... 99/290, 293, 295, 288, 275, 280, 279, 99/284, 300, 310, 313, 368, 370, 375, 99/323.1; 134/8, 21, 22.11, 22.12, 36, 91, 134/186
See application file for complete search history.

(56) References Cited

U.S. PATENT DOCUMENTS

| | | | | |
|---|---|---|---|---|
| 5,498,757 | A | * | 3/1996 | Johnson et al. ............... 426/520 |
| 6,003,569 | A | * | 12/1999 | Williams ...................... 141/362 |
| 7,252,034 | B1 | * | 8/2007 | Eckenhausen et al. ......... 99/293 |
| 2003/0150333 | A1 | * | 8/2003 | Fischer .......................... 99/279 |
| 2005/0172833 | A1 | * | 8/2005 | Ioannone et al. ............... 99/453 |
| 2007/0031558 | A1 | * | 2/2007 | Lussi ............................ 426/520 |
| 2008/0053313 | A1 | * | 3/2008 | Goltenboth .................... 99/290 |

FOREIGN PATENT DOCUMENTS

| | | |
|---|---|---|
| DE | 28 38 235 A | 6/1989 |
| DE | 2 2007 008 813 U | 1/2008 |

(Continued)

OTHER PUBLICATIONS

Translation of DE 3838235 to Crociati, published Jun. 8, 1989.*

*Primary Examiner* — Dana Ross
*Assistant Examiner* — Michael Laflame, Jr.
(74) *Attorney, Agent, or Firm* — DLA Piper LLP (US)

(57) ABSTRACT

A coffee machine comprises a frothing device, wherein an internal milk channel leading to a frothing chamber is provided into which opens a bypass air inlet for operable air supply to the frothing device. A flexible milk suction line connects the frothing device with a milk supply container. Means are provided for cleaning the frothing device and the milk suction line with rinsing water from a continuous-flow water heater of the coffee machine. A controlled valve arrangement is provided which feeds rinsing water from the continuous-flow water heater to the bypass air inlet of the frothing device. A milk suction end of the milk suction line is directly or indirectly, fluid-conductively connectable with a residual water pan of the coffee machine prior to feeding rinsing water to the bypass air inlet.

6 Claims, 2 Drawing Sheets

(56) References Cited

FOREIGN PATENT DOCUMENTS

Figure 1:
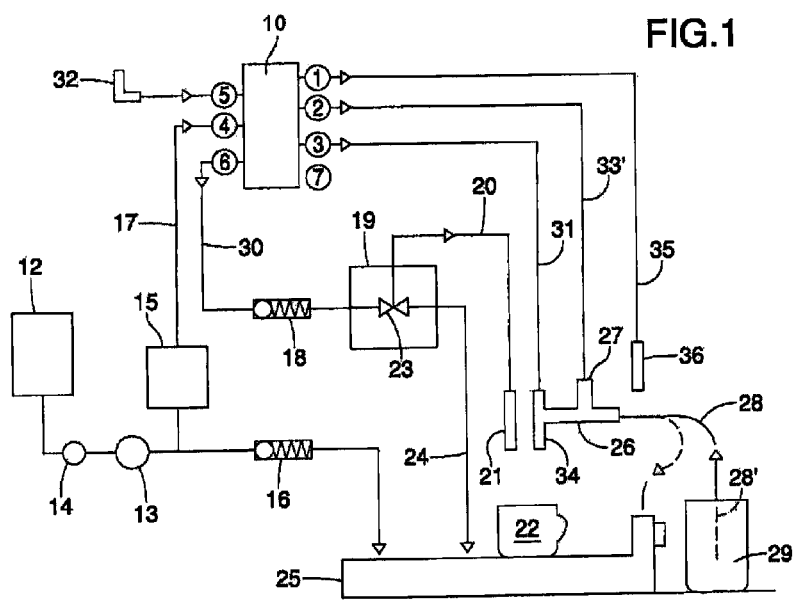

| DE | 20 2008 016 400 U | 4/2009 |
|---|---|---|
| DE | 10 2008 014 884 A | 9/2009 |
| DE | 10 2008 014 886 A | 9/2009 |
| DE | 10 2008 058 139 A | 5/2010 |
| EP | 1 561 407 A | 8/2005 |
| EP | 1 797 801 A | 6/2007 |
| EP | 2 020 197 A | 2/2009 |
| EP | 1 911 382 B | 11/2010 |

* cited by examiner

COFFEE MACHINE COMPRISING A FROTHING DEVICE AND MEANS FOR CLEANING THE FROTHING DEVICE AND A MILK SUCTION LINE AND PROCESS FOR RINSING THE MILK SUCTION LINE

The present invention relates to a coffee machine, particularly to a fully automated espresso machine, comprising a frothing device according to the preamble of claim 1.

One aspect of the invention relates to a process of rinsing a milk suction line according to the preamble of claim 8 connected with a frothing device particularly of a coffee machine.

In practice, espresso machines, particularly fully automated espresso machines comprising a frothing device, have been known in which an internal milk channel leads to a frothing chamber wherein, into the milk channel, an external flexible milk suction line, as a rule a hose, is connected the suction end of which is fluid-conductively connected with, particularly plugged into, a milk supply container. Such milk supply container may be a milk package made of carton.

For hygienic reasons, it is desirable that the milk-guiding parts of the frothing device and the milk suction line be cleaned in not-too-extended intervals. To this end, either hot rinsing water or a steam jet, as a rule, is introduced into the frothing chamber which is cleaned in this way, should the situation arise also together with the internal milk channel. The used rinsing water may be fed into an external rinsing water receiver of the coffee machine and collected, for which purpose the coffee machine includes a residual water pan.

However, in order to clean the milk suction line with rinsing water as well, particular measures are required:

In a coffee machine comprising a hot water and/or steam generator connected with a hot water and/or steam outlet and with a frothing device for milk disposed between a dispensing device and a milk supply container, wherein a feeding line for milk to the milk supply container is provided detachably connected at its inlet end, or milk suction end, respectively, to the supply container, a cleaning device for the feeding line is provided for this purpose which includes the hot water and/or steam outlet and a connecting line for detachably connecting the inlet end, or milk suction end, of the feeding line to the hot water and/or steam outlet (EP 1 797 801 A1). Cleaning the feeding line, or milk suction line, respectively, is performed in that the inlet end, or the milk suction end, of the feeding line is detached from the supply container to be connected with the hot water and/or steam outlet, after which hot water and/or steam injection into the feeding line is effected. After cleaning with the hot water, residual hot water may be flushed out, or sucked off, or otherwise driven out of the feeding line. This coffee machine has, inter alia, the disadvantage that for detachably connecting the inlet end, or the milk suction end, of the feeding line to the hot water and/or steam outlet, high-quality coupling members are required both on the side of the hot water and/or steam outlet and at the milk suction end of the feeding line which are subjected to the pressure and the temperature prevailing in the hot water and/or steam outlet during the cleaning, or rinsing, process. Connecting the coupling member prior to activating the hot water and/or steam outlet should, therefore, be handled carefully as well. Depending on the design of the coupling members, the exterior portion, at least of one of the two connected coupling members, may be left non-rinsed during the cleaning process of the feeding line, or the milk suction line.

Furthermore, there exists a protection and cleaning device for a beverage automat having a connecting configuration formed complementarily to a connecting configuration of the beverage automat, particularly a fully automated coffee machine, comprising at least one feeding channel, which may tightly be connected with the beverage automat in place of a device for mixing air, steam and milk, particularly in place of a milk frothing device (DE 10 2008 014 884 A1). The flow lines in the protection and cleaning device are so arranged that during the operation thereof at least one milk-soiled connecting socket of the connecting configuration at the side of the beverage automat may be cleaned by means of a cleaning agent flowing from the feeding channel. One outlet socket of the protection and cleaning device may be provided for connecting a milk suction pipe so that during the operation of the protection and cleaning device, the connecting configuration at the side of the beverage automat may be cleaned together with the milk suction pipe. This protection and purification device, therefore, constitutes an isolated part which has to be manufactured precisely to fit to the connecting configuration of the beverage automat. The handling of the protection and cleaning device is awkward and elaborate. Moreover, the protection and cleaning device itself requires cleaning, for instance in a dish washer.

Similar disadvantages has a prior art rinsing and cleaning device which may be plugged on, or connected to, at least one hot water dispensing channel of a milk frothing device and which effects, during the operation of the milk frothing device with the rinsing and cleaning device plugged on, a back flushing of the milk frothing device, particularly of those areas of the milk frothing device which come into contact with milk, or with milk froth, during normal operation (DE 10 2008 014 886 A1). The rinsing and cleaning device may include a separate channel section which may be plugged into, or on, a milk inlet channel or onto a milk suction pipe or tube, whereby the milk suction pipe is also back flashed, or cleaned.

It is, therefore, the object of the present invention to provide different means for cleaning the milk suction line, which are structurally simpler, may be handled easily and without danger while nevertheless ensuring effective cleaning, or rinsing, of the milk suction pipe.

The invention refers to a coffee machine comprising a frothing device in which an internal milk channel leading to a frothing chamber is provided into which opens a bypass air inlet for operable air supply to the frothing device. According to the invention, bypass air inlet may be fed, via a controlled valve arrangement, with rinsing water from the continuous-flow water heater of the coffee machine, and, prior to the rinsing water supply to the bypass air inlet, a milk suction end of the milk suction line may, directly or indirectly, fluid-conductively be connected with a residual water pan of the coffee machine while the other end of the milk suction line is, and will remain, connected to an internal milk channel to the frothing chamber during the cleaning process.

The rinsing process to be performed in such a coffee machine is effected in an easily operable way in that for rinsing the flexible milk sucking line, particularly a tube, the milk suction end of the milk suction line removed from the milk supply container is connected with a rinsing water receiver, particularly a residual water pan of the coffee machine and, subsequently, rinsing water is fed into the bypass air inlet of the frothing device, which opens into the internal milk channel of the frothing device to a frothing chamber in the frothing device, to which internal milk channel, on the other hand, the milk suction line is connected. To this end, the bypass air inlet may simply be switched over from an air inlet to a rinsing water source, normally hot water from the outlet of a continuous-flow water heater of the coffee machine.

Connecting the milk suction end of the milk suction line with the rinsing water receiver does not require a high skill of the user particularly when the milk suction end may simply be plugged into a rinsing water draining socket above the residual water pan and in this way opens into the residual water pan. The rinsing water receiver or the residual water pan is on a low temperature level so that the user will not run the risk of scalding. The temperature at the milk suction end of the milk suction line passed by rinsing water as compared to the end connected with the frothing device during rinsing is reduced as well.

In that the bypass air inlet of the frothing device opens into the internal milk channel of the frothing device which terminates in the frothing chamber, when treating the bypass air inlet with the rinsing agent, hot rinsing water as a rule, not only is the milk suction line via a first section of the internal milk channel impacted by a substantial portion of the rinsing water but part of the rinsing water will flow through a second section of the internal milk channel into the frothing chamber and thus can, simultaneously with the milk suction line, rinse the inner faces thereof as well.

The means provided for cleaning the frothing device and the milk suction line are little elaborate, particularly if for the coffee machine, or a fully automated espresso machine, a controlled valve arrangement has been provided anyway, which is merely to be expanded for the cleaning of the frothing device and milk suction line. The fluid-conductive connection of the milk suction end of the milk suction line with the residual water pan of the coffee machine may simply be realized in that the open milk suction end above the residual pan opens into the pan.

For a safe and reliable application of the milk suction end of the milk suction line, the coffee machine housing is, therefore, provided with a rinsing water drain socket above the residual water pan so that the rinsing water drain socket opens into the residual water pan. The milk suction end should be so shaped that it may be coupled to this rinsing water drain socket or may simply be plugged in.

In order to further reduce the likelihood of a faulty operation, notwithstanding the simple operability of the means for cleaning the frothing device and the milk suction line with rinsing water, a control unit by which the controlled valve arrangement may be controlled, i.e. may be switched over for cleaning, is connected with an electric indication which indicates a command for connecting the milk suction end with the residual water pan before the rinsing water supply to the bypass air inlet of the frothing device is activated.

Moreover, it can safely be avoided that rinsing water will flow via the non-changed milk suction end of the milk suction line into the milk supply container in that, on the rinsing water drain socket, a switch or sensor to be activated by plugging in the milk suction end of the milk suction line is arranged via which the rinsing water supply to the bypass air inlet of the frothing device is activated when the switch or sensor detects the plugged-in milk suction end. The switch or sensor may switch on a pump which pumps cold water to the continuous flow water heater of the coffee machine which is heated in the continuous flow water heater and, via the controlled valve arrangement, is fed as rinsing water to the bypass air inlet.

A multipath valve, preferably a ceramics valve, adapted to clean the frothing device and the milk suction line, is particularly suitably employed as a controlled valve arrangement which includes at least one inlet connected with an air inlet, an inlet connected with a continuous-flow water heater outlet, and an outlet connected with the bypass air inlet of the frothing device.

By means of such a multipath valve, or ceramics valve, feeding of the rinsing water into the bypass air inlet is effected by switching over the ceramics valve flow-wisely disposed between the bypass air inlet, on one hand, and the air inlet and the outlet of the continuous-flow water heater, on the other, from a valve position wherein the bypass air inlet is connected with the air inlet, into a valve position wherein the bypass air inlet is connected with the outlet of the continuous-flow water heater, and when cold water is pumped into the latter. The water heated in the continuous-flow water heater will then continue to flow via a flow path of the ceramics valve and the bypass air inlet into the frothing device and via its internal milk channel into the milk suction line.

The control valve arrangement designed as a multipath valve, or ceramics valve, suit-ably includes further outlets with which particularly the inlet connected with the continuous-flow water heater may be connected, namely one outlet which is connected via a steam duct with the frothing device, one outlet which is connected via a first hot water duct with a brewing unit of the coffee machine, and one outlet which is connected via a second hot water duct with an external hot water outlet in order to generate, depending on the setting of the valve arrangement, milk froth, coffee, from it cappuccino, or simply hot water only which may be used in a common way for brewing tea or to prepare soups from instant powder.

In the following, two variants of a coffee machine according to the invention will be described based on four figures from which further advantageous details of the invention can be taken.

Figures 2A, 2B:
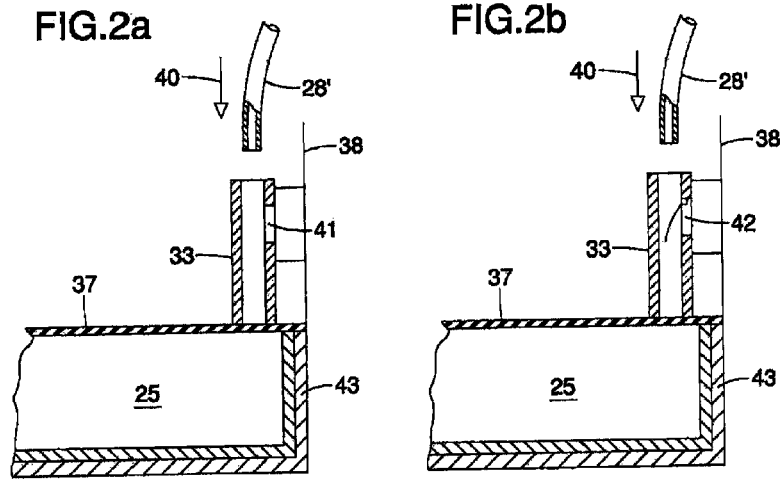
Figure 3:
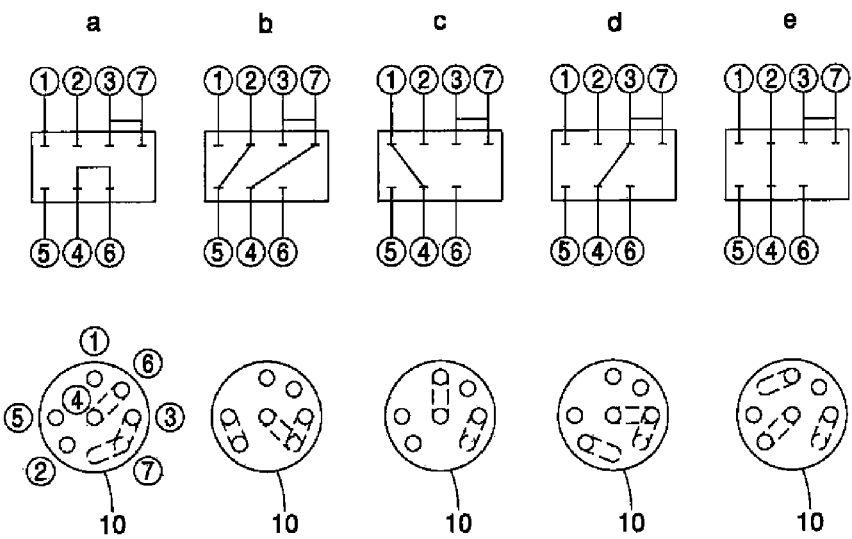
Figure 4:
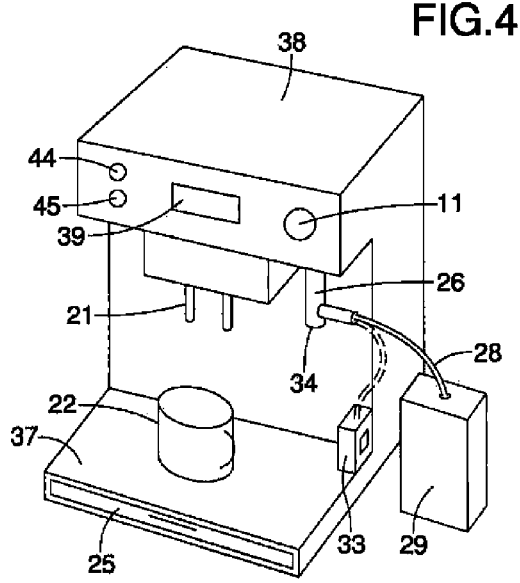

FIG. 1 shows, roughly diagrammatically, a representation of the functional elements of the coffee machine together with the means for cleaning a frothing device and a milk suction line of the coffee machine, FIG. 2*a* shows a detail within a cut-out area of a residual water pan of the coffee machine in a first variant, FIG. 2*b* shows a representation according to FIG. 2*a*, however, in a second variant, FIG. 3 shows a ceramics valve displaying five valve positions together with the respective connecting diagram, and FIG. 4 shows a simple graphic representation of the coffee machine which comprises the means for cleaning of the frothing device and a milk suction pipe included in it.

The coffee machine shown in the drawing, particularly in FIGS. 1, 3 and 4, comprises components for normal coffee and milk froth preparation which will be described together with the functions thereof.

The coffee machine includes a ceramics valve 10 having an extended function or position as compared to a ceramics valve of a common coffee machine, all adjustable positions being shown in FIG. 3. The ceramics valve 10 includes ceramics valve inlets and outlets 1-7 which will be described later in detail. The upper row of FIG. 3 shows connection diagrams a, b, c, d, e which constitute part of the five different positions of the ceramics valve 10 according to the lower row of FIG. 3. The positions of
the ceramics valve 10 are set by a selector switch 11 on the front side of the coffee machine, see FIG. 4.

For common coffee preparation, the ceramics valve 10 is in position a of FIG. 3, as will explained later on.

Inter alia for coffee preparation, a predetermined amount of cold water is passed by a pump 13 from a water container 12 containing cold water via a flow meter 14 through a continuous-flow water heater, and from an outlet (not shown) of the continuous-flow water heater further to a hot water and/or steam duct 17 to an inlet 4 of the ceramics valve 10. In the ceramics valve 10, a connection 4-6 is switched to the outlet 6 for coffee preparation so that the hot water from the continuous-flow water heater 15 flows via a hot water duct 30 and a counter pressure valve 18 into a brewing unit 19. From the brewing unit 19, the coffee brewed therein may be dispensed via a coffee duct 20 and a coffee outlet 21 in a coffee cup 22. After the coffee preparation process, a drain valve 23 opens whereby residual water flows off via a drain duct 24 into a residual water pan 25.

From the outlet of the water pump 13, a duct (not described) including a relief valve 16 leads to the residual water pan as well.

For cappuccino preparation and milk frothing in general, a frothing unit 26 is provided comprising a bypass air inlet 27, an internal milk channel and a frothing chamber built as in accordance with the Venturi principle and generating an underpressure. The internal milk channel and the frothing chamber are not shown in the figures. The bypass air inlet 27 opens into the internal milk channel which, on one hand, is open to the frothing chamber and to which, on the other hand, a pipe-like milk suction line 28 is solidly connected. For milk froth making or for cappuccino preparation, the flexible milk suction line 28 opens into a milk supply container 29, as shown in FIG. 1 by a drawn-through line. For milk froth making, the frothing device 26 is treated with the steam generated in the continuous-flow water heater 15 whereby the water conduction up to the continuous-flow water heater is the same as in the case of coffee preparation described above. The steam generated in the continuous-flow water heater 15 flows via the hot water and/or steam duct 17 to the inlet 4 of the ceramics valve 10 in which connections 4-7/3 are switched through for milk froth making so that the steam flows via a steam duct 31 into the frothing device 26. In the frothing device 26, the Venturi effect causes that in the frothing chamber milk is sucked from the milk supply container 29 via the milk suction line 28 therein introduced. Since for frothing up, the milk flowing in the internal milk channel of the frothing device should be intermixed with air, an air path 5-2 for the supply of the air is switched-through in the ceramics valve 10 in addition to the steam path connection referred to above. In this way, the milk flowing in the internal milk channel of the frothing device 26 may suck air via the bypass air inlet 27 which arrives via an air inlet 32 and the air path 5-2 cleared in the ceramics valve 10 into an air connection duct 33'. The milk froth thus being generated in the frothing device 26 flows, via a milk froth outlet 34, out from the frothing device 26. The above-mentioned air path extension 5-2 and the above-mentioned steam connection 4-7/3 in the ceramics valve 10 are shown in FIG. 3 under b.

Hot milk is prepared at a switch position of the ceramics valve 10 according to b under FIG. 3 similar to milk froth preparation, except that there is no switch-through of the air path 5-2 in the ceramics valve.

For simple water preparation, the water is passed up to the ceramics valve inflow 4, as explained above in connection with the coffee preparation. In the ceramics valve 10, to this end, path 4-1 is switched-through so that the hot water flows via a hot water duct 35 into a hot water outlet 36. The ceramics valve position for hot water preparation is shown in FIG. 3 under c.

Any required rinsing of the milk paths, both of the frothing device 26 and of the milk suction line 28, is performed by rinsing water which is conducted, as is the hot water for the above simple hot water preparation, to the inlet 4 of the ceramics valve 10, but subsequently flows, via the path 4-2 switched-through in the ceramics valve 10 and via the air connection duct 33' into the bypass air inlet 27 of the frothing device 26. Prior thereto, the milk suction end 28' was withdrawn from the milk supply container 29 and plugged into a rinsing water drain socket 33 provided above the residual water pan 25 which is partly covered by a pan lid 37, wherein the pan lid 37 may constitute a fixed component part of the coffee machine housing 38. The rising water drain socket 33 is in fluid-conductive connection with the interior of the residual water pan 25.

When the milk suction end 28' of the milk suction line 28 is plugged into the rinsing water drain socket 33 in the direction of the arrow 40, the rinsing water supply to the frothing device 26 may be activated by switching the water pump 13 on, after which the rinsing water may pass both through the frothing device 26 and through the milk suction line 28 into the residual water pan 25.

In order to request the user of the coffee machine, prior to activating the rinsing process, to plug the milk suction end 28' into the rinsing water drain socket 33, a respective command will be shown on an electric indicator 39 on the front side of the coffee machine, see FIG. 4, when the selector switch 11 has been set.

In order to ensure that no faulty activation of the rinsing water supply to the frothing device 26 and into the milk suction line 28 will occur before their milk suction end 28' has been plugged into the rinsing water drain socket 33, either a sensor 41, see FIG. 2a, or a switch 42, namely a micro switch, see FIG. 2b, is arranged on the rinsing water drain socket 33 so that it is activated by the milk suction end 28' of the milk suction line 28 plugged in the direction of arrow 40 to initiate and maintain only on activation thereof the rinsing water supply to the frothing device 28 and the milk suction line 28 by supplying current to the water pump 23.

As can be taken from FIG. 4 in combination with FIGS. 2a and 2b, the residual water pan 25 is formed as a drawer so that it can be drawn out for emptying from the housing base 43 of the coffee machine. In that case, the rinsing water drain socket 33 will remain solidly connected with the pan lid 37, or the coffee machine housing 38, respectively.

From FIG. 4, furthermore, it can be taken that on the front side of the coffee machine housing 38, a mains switch 44 and a turn-on switch 45 are provided by means of which one of the functions each as described above selected by selector switch 11 may be activated.

The invention claimed is:

1. A coffee machine comprising:
    a frothing device having an internal milk channel leading to a frothing chamber into which opens a bypass air inlet for operable air supply to the frothing device;
    a flexible milk suction line to a milk supply container connected to the frothing device;
    means for cleaning the frothing device and the milk suction line with heated rinsing water from a continuous-flow water heater that flows via a path in a multi-path valve into the bypass air inlet, into the frothing device and into the milk suction line, wherein
    a milk suction end of the milk suction line is fluid-conductively connectable with a residual water pan prior to feeding the rinsing water to the bypass air inlet, and
    the multi-path valve further comprises:
    a first inlet connected with an air inlet,
    a second inlet connected with an outlet of the continuous-flow water heater,
    a first outlet connected with the bypass air inlet of the frothing device,
    a second outlet which is connected via a steam duct with the frothing device,
    a third outlet which is connected via a first hot water duct with a brewing unit of the coffee machine, and a fourth outlet which is connected via a second hot water duct with a hot water outlet.

2. The coffee machine according to claim 1, further comprising:
   a coffee machine housing; and
   a rinsing water socket provided on the coffee machine housing, wherein
   the milk suction end of the milk suction line may be coupled to the rinsing water socket and opens into the residual water pan.

3. The coffee machine according to claim 2 wherein the milk suction end of the milk suction line may be plugged into the rinsing water drain socket.

4. The coffee machine according to one of the foregoing claims, further comprising:
   a control unit that controls the controlled valve arrangement, and
   an electric indicator connected to the control unit that indicates a command for connecting, prior to activating the rinsing water supply to the bypass air inlet of the frothing device, the milk suction end with the residual water pan.

5. The coffee machine according to claim 3, further comprising:
   a switch or sensor disposed on the rinsing water drain socket which is activated by plugging in the milk suction end of the milk suction line, and which activates the rinsing water supply to the bypass air inlet of the frothing device.

6. The coffee machine according to claim 1, wherein the multi-path valve is a ceramics valve.

* * * * *